(12) United States Patent
Uochi

(10) Patent No.: US 8,687,157 B2
(45) Date of Patent: Apr. 1, 2014

(54) LIQUID CRYSTAL DISPLAY DEVICE

(75) Inventor: Hideki Uochi, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 645 days.

(21) Appl. No.: 11/548,134

(22) Filed: Oct. 10, 2006

(65) Prior Publication Data

US 2007/0126968 A1    Jun. 7, 2007

(30) Foreign Application Priority Data

Oct. 18, 2005  (JP) ................................ 2005-303028

(51) Int. Cl.
*G02F 1/1343*    (2006.01)

(52) U.S. Cl.
USPC ........................................................ 349/141

(58) Field of Classification Search
USPC ........................................................ 349/141
See application file for complete search history.

(56) References Cited

U.S. PATENT DOCUMENTS

| | | | |
|---|---|---|---|
| 5,870,160 A | 2/1999 | Yanagawa et al. | |
| 5,936,688 A | 8/1999 | Tsuda et al. | |
| 6,034,757 A | 3/2000 | Yanagawa et al. | |
| 6,108,066 A | 8/2000 | Yanagawa et al. | |
| 6,160,600 A | 12/2000 | Yamazaki et al. | |
| 6,449,026 B1 * | 9/2002 | Min et al. | 349/141 |
| 6,600,535 B1 | 7/2003 | Tsuda et al. | |
| 6,630,977 B1 | 10/2003 | Yamazaki et al. | |
| 6,646,692 B2 | 11/2003 | Yamazaki et al. | |
| 6,762,813 B1 | 7/2004 | Zhang et al. | |
| 6,833,892 B2 | 12/2004 | Kamijo | |
| 6,914,656 B2 | 7/2005 | Sakamoto et al. | |
| 6,950,168 B2 | 9/2005 | Yamazaki et al. | |
| 6,963,382 B1 | 11/2005 | Yamazaki et al. | |
| 6,987,552 B2 | 1/2006 | Yamazaki et al. | |
| 7,064,802 B2 * | 6/2006 | Lin | 349/141 |
| 7,088,409 B2 | 8/2006 | Itou et al. | |
| 7,126,661 B2 | 10/2006 | Yamazaki et al. | |
| 7,130,000 B2 | 10/2006 | Kim | |
| 7,333,169 B2 | 2/2008 | Zhang et al. | |
| 7,387,905 B2 | 6/2008 | Kim | |
| 7,525,614 B2 * | 4/2009 | Jeong et al. | 349/114 |
| 7,567,328 B2 | 7/2009 | Yamazaki et al. | |

(Continued)

FOREIGN PATENT DOCUMENTS

| | | |
|---|---|---|
| CN | 1497311 A | 5/2004 |
| CN | 1501099 A | 6/2004 |

(Continued)

OTHER PUBLICATIONS

S. H. Lee et al., "29.2: 18.1 Ultra-FFS TFT-LCD With Super Image Quality and Fast Response Time", SID 01 Digest, 2001, pp. 484-487.

(Continued)

*Primary Examiner* — Uyen-Chau N Le
*Assistant Examiner* — Hoang Tran
(74) *Attorney, Agent, or Firm* — Fish & Richardson P.C.

(57) ABSTRACT

To provide a portable electronic device monitor which is a horizontal electric field liquid crystal display device and which is capable of clear display even outdoors. A reflective electrode is provided in a horizontal electric field liquid crystal display device. By providing the reflective electrode, natural light can be reflected efficiently and clear display can be provided outdoors. In addition, by providing the reflective electrode with unevenness, reflectance can be increased. The present invention provides a horizontal electric field liquid crystal display device such as this which is capable of clear display even outdoors.

36 Claims, 13 Drawing Sheets

(56) References Cited

U.S. PATENT DOCUMENTS

| | | |
|---|---|---|
| 7,701,541 B2 | 4/2010 | Yamazaki et al. |
| 7,868,984 B2 | 1/2011 | Zhang et al. |
| 2002/0067454 A1 | 6/2002 | Hong et al. |
| 2003/0103181 A1 | 6/2003 | Imayama et al. |
| 2003/0218664 A1 | 11/2003 | Sakamoto et al. |
| 2005/0030451 A1 | 2/2005 | Liu |
| 2005/0105033 A1 | 5/2005 | Itou et al. |
| 2005/0128390 A1 | 6/2005 | Yang |
| 2005/0140867 A1 | 6/2005 | Choi |
| 2005/0179841 A1 | 8/2005 | Yang |
| 2005/0225708 A1* | 10/2005 | Oke et al. .................. 349/139 |
| 2005/0231673 A1 | 10/2005 | Yamazaki et al. |
| 2005/0264731 A1 | 12/2005 | Itou et al. |
| 2006/0001817 A1 | 1/2006 | Yamazaki et al. |
| 2006/0092356 A1 | 5/2006 | Morimoto et al. |
| 2006/0092363 A1 | 5/2006 | Hasegawa et al. |
| 2006/0192912 A1 | 8/2006 | Itou et al. |
| 2006/0215086 A1 | 9/2006 | Kurasawa |
| 2006/0215087 A1 | 9/2006 | Matsushima et al. |
| 2006/0267891 A1 | 11/2006 | Nishimura et al. |
| 2007/0126969 A1 | 6/2007 | Kimura et al. |
| 2007/0146591 A1 | 6/2007 | Kimura et al. |

FOREIGN PATENT DOCUMENTS

| | | |
|---|---|---|
| JP | 07-036030 | 2/1995 |
| JP | 09-105918 | 4/1997 |
| JP | 09-146108 | 6/1997 |
| JP | 09-292504 | 11/1997 |
| JP | 2000206564 A | 7/2000 |
| JP | 2002-182228 | 6/2002 |
| JP | 2002-268042 A | 9/2002 |
| JP | 2003-344837 | 12/2003 |
| JP | 2004-157552 | 6/2004 |
| JP | 2004-252071 | 9/2004 |
| JP | 2005-055863 | 3/2005 |
| JP | 2005-106967 | 4/2005 |
| JP | 2005-107489 | 4/2005 |
| JP | 2005-338256 | 12/2005 |
| JP | 2006-126551 | 5/2006 |
| JP | 2006-126602 | 5/2006 |
| JP | 2006-184325 | 7/2006 |
| JP | 2006-243144 | 9/2006 |
| JP | 2006-276110 | 10/2006 |
| JP | 2006-276112 | 10/2006 |
| JP | 2006317905 A | 11/2006 |
| JP | 2007-004126 | 1/2007 |
| KR | 20030091758 A | 12/2003 |
| KR | 20050016098 A | 2/2005 |
| TW | 574587 A | 2/2004 |
| TW | 200521591 A | 7/2005 |
| TW | 200523605 A | 7/2005 |

OTHER PUBLICATIONS

J. H. Song et al., "Electro-optic Characteristics of Fringe-Field Driven Transflective LCD with Dual Cell Gap", IDW/AD 2005, vol. 1, pp. 103-106.

M. O. Choi et al., "P-110: A Single Gap Transflective Display Using a Fringe-Field Driven Homogeneously Aligned Nematic Liquid Crystal Display", SID 05 Digest, 2005, pp. 719-721.

R. Lu et al., "4.4: Transflective Liquid Crystal Display Using In-plane Switching Effect", IDRC 06, Sep. 2006, pp. 39-42.

G. S. Lee et al., "6.3: Design of Wide-Viewing-Angle Transflective IPS LCD", IDRC 06, Sep. 2006, pp. 75-77.

N. Aoki, "16.3: Invited Paper: Advanced IPS Technology for Mobile Applications", SID 06 Digest, Jun. 2006, pp. 1087-1090.

M. Sakamoto et al,, "L-6: Late-News Paper: Development of the Novel Transflective LCD Module Using Super-Fine-TFT Technology", SID 06 Digest, Jun. 2006, pp. 1669-1672.

Gak Seok Lee et al., "Optical Configurations of Horizontal Switching Transflective LCDs in Double Cellgap Structure", IDW/AD 05, 2005, pp. 111-114.

O. Itou et al., "P-231L: Late-News Poster: A Wide Viewing Angle Transflective IPS LCD Applying New Optical Design", SID 06 Digest, Jun. 2006, pp. 832-835.

European Search Report (Application No. 06024061.1), dated Apr. 18, 2007, 14 pages.

PCT International Search Report (Application No. PCT/JP2006/324313), dated Jan. 23, 2007, 3 pages.

PCT Written Opinion (Application No. PCT/JP2006/324313), dated Jan. 23, 2007, 4 pages.

Japan 07-036030—English abstract provided by esp@cenet database—Worldwide (2006).

Japan 09-146108—English abstract provided by esp@cenet database—Worldwide (2006) and family to U.S. Patent No. 6,160,600, U.S. Patent No. 6,963,382 and U.S. Patent Application Publication No. 2006/0001817.

Japan 09-292504—English abstract provided by esp@cenet database—Worldwide (2006) and family to U.S. Patent No. 5,936,688 and U.S. Patent No. 6,600,535.

Japan 2002-182228—English abstract provided by esp@cenet database—Worldwide.

Japan 2004-157552—English abstract provided by esp@cenet database—Worldwide.

Japan 2004-252071—English abstract provided by esp@cenet database—Worldwide.

Japan 2005-107489— English abstract provided by esp@cenet database —Worldwide (2006) and family to U.S. Patent Application Publication No. 2005/0231673.

J.H. Song et al.; "Electro-optic Characteristics of Fringe-Field Driven Transflective LCD with Dual Cell Gap"; *IDW/AD '05 Proceedings of the 12th International Display Workshops in conjunction with Asia Display 2005*, vol. 1LCTp1-3; pp. 103-106; Dec. 6, 2005.

Office Action (Application No. 200610136286.1) Dated Sep. 18, 2009 with English translation.

Chinese Office Action issued in Application No. 200610136286.1 on Jul. 30, 2010, with full English translation, 30 pages.

Taiwanese Office Action (Application No. 95137168) dated Dec. 22, 2012, with full English translation.

"Korean Office Action (Application No. 2006-0099330) dated Nov. 29, 2012," with Full English Translation, 7 pages.

* cited by examiner

LIQUID CRYSTAL DISPLAY DEVICE

BACKGROUND OF THE INVENTION

1. Field of the Invention

The present invention relates to a horizontal electric field liquid crystal display device which is capable of a clear display even outdoors.

2. Description of the Related Art

Liquid crystal driving methods for liquid crystal display devices include a vertical electric field method in which voltage is applied perpendicular to a substrate, and a horizontal electric field method in which voltage is applied parallel to a substrate. There are advantages and drawbacks to both the vertical electric field method and the horizontal electric field method. For example, compared to the vertical electric field method, which is typified by the TN (Twisted Nematic) method, the horizontal electric field method has qualities such as a wide viewing angle, high contrast, and a high gradation display. The horizontal electric field method is used for monitors and televisions. Each of these kinds of liquid crystal display devices coexists in the field of liquid crystal, and product development is being carried out on them. Further, development is being carried out of liquid crystal materials for use with the horizontal electric field method and of liquid crystal materials for use with the vertical electric field method. The materials have different characteristics depending on the direction that voltage is applied in.

Further, methods for horizontal electric field liquid crystal display devices include an IPS (In-Plane Switching) method and an FFS (Fringe Field Switching) method. Conventional FFS liquid crystal display devices include a device in which one pixel is equipped with a transmissive region and a reflective region (Reference 1: Japanese Published Patent Application No. 2005-107489).

Conventional horizontal electric field liquid crystal display devices are often used for computer monitors, but have not been used for portable electronic device monitors for cellular phones and the like. If applied to a portable device, the device may be used under natural light, and a so-called reflective liquid crystal panel is employed. A design in which the area of a reflective electrode is increased in order to achieve high reflectance is used. However, in a case where the horizontal electric field method is used, if a common electrode and a pixel electrode are made into a reflective electrode to increase the area of the reflective electrode, an electric field that is applied to liquid crystal molecules above the reflective electrode weakens, and liquid crystal molecules might malfunction. As a result, not much development of a reflective-type horizontal electric field liquid crystal display device has been carried out.

SUMMARY OF THE INVENTION

Therefore, an object of the invention is to provide a portable electronic device monitor which is a horizontal electric field liquid crystal display device and which is capable of clear display even outdoors.

In view of the above object, the invention provides a horizontal electric field liquid crystal display device which is provided with a reflective electrode. By providing a reflective electrode, a horizontal electric field liquid crystal display device which can reflect natural light and conduct display clearly outdoors can be provided.

A specific structure of the invention is described below.

One mode of the invention is a liquid crystal display device which includes a liquid crystal layer comprising liquid crystal molecules and sandwiched between a pair of substrates which are disposed opposite each other, a light-reflective common electrode which is over one of the substrates, and a light-transmitting pixel electrode which is over the common electrode with an insulating layer interposed therebetween. The liquid crystal is driven by a horizontal electric field method in which an electric field is generated between the common electrode and the pixel electrode.

Another mode of the invention is a liquid crystal display device which includes a liquid crystal layer comprising liquid crystal molecules and sandwiched between a pair of substrates which are disposed opposite each other, a light-reflective common electrode which is over one of the substrates, and a light-transmitting pixel electrode which is over the common electrode with a first insulating layer interposed therebetween. The common electrode is provided over a second insulating layer which has an uneven shape. A surface of the common electrode has a shape which corresponds with the uneven shape. The liquid crystal is driven by a horizontal electric field method in which an electric field is generated between the common electrode and the pixel electrode.

Another mode of the invention is a liquid crystal display device which includes a liquid crystal layer composed of liquid crystal molecules that is sandwiched between a pair of substrates which are disposed opposite each other, a light-reflective common electrode which is over one of the substrates, and a light-transmitting pixel electrode which is over the common electrode with a first insulating layer interposed therebetween. The common electrode is provided over a second insulating layer which has an uneven shape. A surface of the common electrode has a shape which corresponds with the uneven shape. Also included is a planarizing film comprising a third insulating layer formed over the common electrode. The first insulating layer is formed over the third insulating layer. The liquid crystal is driven by a horizontal electric field method in which an electric field is generated between the common electrode and the pixel electrode.

Another mode of the invention is a liquid crystal display device which includes a liquid crystal layer comprising liquid crystal molecules and sandwiched between a pair of substrates which are disposed opposite each other, a light-transmitting common electrode which is over one of the substrates, and a light-transmitting pixel electrode which is over the common electrode with a first insulating layer interposed therebetween; and a reflective electrode which is on a side of the other substrate, where the liquid crystal layer is not provided. The reflective electrode is provided over a third insulating layer which has an uneven shape. A surface of the reflective electrode has a shape which corresponds with the uneven shape. The liquid crystal is driven by a horizontal electric field method in which an electric field is generated between the common electrode and the pixel electrode.

Another mode of the invention is a liquid crystal display device which includes a liquid crystal layer comprising liquid crystal molecules and sandwiched between a pair of substrates which are disposed opposite each other, a light-transmitting common electrode which is over one of the substrates, and a light-transmitting pixel electrode which is over the common electrode with a first insulating layer interposed therebetween; and a reflective electrode which is on a side of the other substrate, where the liquid crystal layer is provided. The reflective electrode is provided over a second insulating layer which has an uneven shape. A surface of the reflective electrode has a shape which corresponds with the uneven shape. Also included is a planarizing film comprising a third insulating layer is formed over the reflective electrode. The liquid crystal is driven by a horizontal electric field method in which an electric field is generated between the common electrode and the pixel electrode.

Another mode of the invention is a liquid crystal layer comprising liquid crystal molecules and sandwiched between a pair of substrates which are disposed opposite each other, a light-transmissive common electrode, a reflective electrode on the common electrode and a light-transmissive pixel electrode which is provided over the reflective electrode with a first insulating layer interposed therebetween. The common electrode is provided over a second insulating layer having an uneven shape. A surface of the common electrode has a shape which corresponds with the uneven shape. A surface of the reflective electrode has a shape which corresponds with the uneven shape. The liquid crystal layer is driven by a horizontal electric field method in which an electric field is generated between the common electrode and the pixel electrode.

Another mode of the invention is a liquid crystal layer comprising liquid crystal molecules and sandwiched between a pair of substrates which are disposed opposite each other. A reflective electrode, a light-transmissive common electrode which is provided over the reflective electrode with a first insulating layer interposed between, and a light-transmissive pixel electrode which is provided over the common electrode with a second insulating layer interposed between. The reflective electrode is provided over a third insulating layer having an uneven shape. A surface of the reflective electrode has a shape which corresponds with the uneven shape. The first insulating layer is a planarizing film. The liquid crystal layer is driven by a horizontal electric field method in which an electric field is generated between the common electrode and the pixel electrode.

In the invention, the pixel electrode can include indium tin oxide (ITO).

In the invention, a transistor is connected to the pixel electrode, and can control voltage of the pixel electrode.

In the invention, in a pixel layout as seen from above, a shape of a pixel electrode can be rectangular.

A horizontal electric field method liquid crystal display device provided with a reflective electrode according to this invention can efficiently reflect natural light and provide a clear display outdoors.

DETAILED DESCRIPTION OF THE INVENTION

Figure 1:
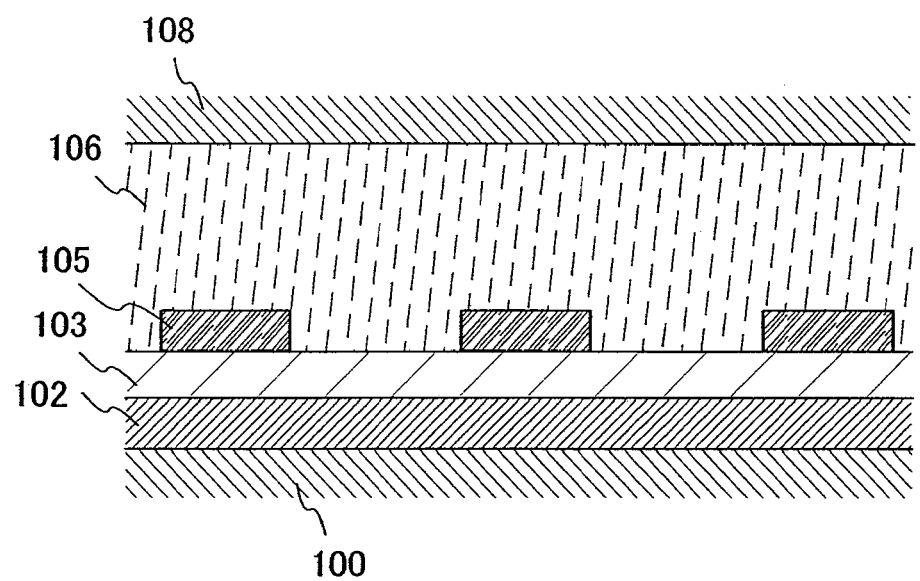
FIG. 1 is a cross-sectional diagram of a liquid crystal display device of the invention.

Embodiment modes of the invention will be explained, with reference to the drawings. Note that it is easily understood by those skilled in the art that the invention is not limited to the following descriptions, and various changes may be made in form and details without departing from the spirit and the scope of the invention. Therefore, the invention should not be limited to the descriptions of the embodiment modes below. Note that in the drawings, parts which are the same or which have similar functions are denoted by the same reference symbols, and repetitious explanation thereof is omitted.

Embodiment Mode 1

In this embodiment mode, a structure of a horizontal electric field liquid crystal display device will be explained.

In FIG. 1, a cross-section of an FFS liquid crystal display device is shown. A conductive layer which functions as a common electrode 102 of a liquid crystal display device is provided over a substrate 100 which has an insulating surface (hereinafter referred to as an insulating substrate). As examples of the insulating substrate 100, a glass substrate, a quartz substrate, a plastic substrate, and the like can be given. For example, if a plastic substrate is used, a lightweight liquid crystal display device with good flexibility can be provided. Alternatively, by thinning a glass substrate by polishing or the like, a thin-type liquid crystal display device can be provided. Further alternatively, over a conductive substrate such as a metal substrate or a semiconductive substrate such as a silicon substrate, a layer having an insulating property is formed; and the substrate obtained thus may be used as an insulating substrate.

In this embodiment mode, a conductive material with a reflective property is used for the common electrode 102. Such an electrode having a conductive material with a reflective property is also referred to as a reflective electrode. As examples of the conductive material with a reflective property, an element chosen from among tantalum (Ta), tungsten (W), titanium (Ti), molybdenum (Mo), aluminum (Al), chromium (Cr), silver (Ag), and the like, or an alloy material containing such an element as its main component can be used. The common electrode 102 can have a single layer structure or a stacked layer structure. In a case where a stacked layer structure is used, a material with reflectiveness is used to form the top layer of the stack. The other layer or layers can be formed of a material having low resistance, rather than a reflective material. Accordingly, a common electrode 102 that has a reflective property and low resistance can be formed. The common electrode 102 is controlled by an electrically connected driver circuit.

A pixel electrode 105 is formed above the common electrode 102. The width of the pixel electrode 105 can be determined by the size of molecules of a liquid crystal material. If the width of the pixel electrode 105 is too large in comparison to the molecular size of the liquid crystal material, it becomes difficult to apply an electric field to the molecules over the pixel electrode. Therefore, the width of the pixel electrode 105 is determined in the range of from 10 μm to 15 μm according to the molecular size of the liquid crystal material. Further, to prevent the common electrode 102 and the pixel electrode 105 from short-circuiting, an insulating layer 103 is formed. Furthermore, the insulating layer 103 also functions as a base film which prevents impurity contamination from the insulating substrate 100. The common electrode 102 is formed over the whole surface of a pixel portion of the insulating substrate. However, the pixel electrode 105 is formed selectively over the insulating layer 103. An electric field can be applied between the common electrode 102, which is formed over the whole surface, and the pixel electrode 105, which is formed selectively. Accordingly, molecules of a liquid crystal layer can be controlled. The pixel electrode 105 can be formed of a material having a light-transmitting property or of a material having a reflective property. By forming the pixel electrode 105 of a material having a light-transmitting property, the aperture ratio can be increased. By forming the pixel electrode 105 of a material having a reflective property, reflectance can be increased. When the pixel electrode 105 is formed of a material having a reflective property, reflectance can be further increased by increasing the width of the electrode.

The insulating layer 103 can be formed of an inorganic material or of an organic material. When an inorganic material is used, silicon oxide or silicon nitride can be used. Silicon oxide and silicon nitride can be formed using a CVD method or a sputtering method. In the case where an organic material is used to form the insulating layer 103, a compound such as an acrylic resin, a polyimide resin, a melamine resin, a polyester resin, a polycarbonate resin, a phenolic resin, an epoxy resin, polyacetal, polyether, polyurethane, polyamide (nylon), a furan resin, or a diallyl phthalate resin can be used. A material with high viscosity such as an acrylic resin or a polyimide resin can be formed by an application method, a spin-coating method, or a droplet-discharge method. A droplet-discharge method is a method in which a prepared constituent jets out of a nozzle in response to an electric signal, forming a minute droplet which is then adhered to a prescribed position. The droplet-discharge method is also referred to as an ink-jet method. The pixel electrode 105 is preferably formed of a light-transmitting material, in order to increase the aperture ratio. For example, a light-transmitting conductive material such as indium tin oxide (ITO), zinc oxide (ZnO), indium zinc oxide (IZO), or gallium-doped zinc oxide (GZO) can be used. Further, indium tin oxide containing silicon oxide (hereafter referred to as ITSO), or ITO with zinc oxide (ZnO) mixed in it can be used.

The pixel electrode 105 is controlled by a transistor which is electrically connected to the pixel electrode 105. A thin-film transistor (also referred to as a TFT) having a thin-film semiconductor layer can be used as the transistor.

Further, a substrate 108 (hereafter referred to as a counter substrate) which faces the insulating substrate 100 is prepared. The counter substrate 108 is provided with a color filter for the purpose of conducting full-color display. The color filter can have color red (R), color green (G), and color blue (B). These can be arranged so as to intersect at right angles to each other, or arranged to form what is called a 'delta arrangement', in which pixels are shifted by half a pixel.

Display can be conducted since the insulating substrate 100 and the counter substrate 108 sandwich a layer 106 having a liquid crystal material (hereafter referred to as a liquid crystal layer). A liquid crystal material having either a positive or a negative dielectric constant anisotropy can be used as the liquid crystal material. A horizontal electric field method using such a liquid crystal material has a voltage holding property which is high, so a compound having a cyano base can be employed. Nematic liquid crystal, ferroelectric liquid crystal, antiferroelectric liquid crystal, or the like may also be used. For holding the insulating substrate 100 and the counter substrate 108 together, a sealing material is used, and columnar spacers or spherical spacers are arranged to maintain the distance between the two substrates. In a case where columnar spacers are employed, an insulating layer which is processed into a prescribed shape can be used. As spherical spacers, silica beads can be used. These spacers may also have a function as a drying agent. Note that at the interface of the liquid crystal layer 106, an orientation film that has undergone rubbing treatment is provided. A first slant of the liquid crystal molecules, the so-called pretilt angle, can be determined by this orientation film.

Display can be conducted by the liquid crystal molecules changing slant due to a horizontal electric field. The horizontal electric field is between the common electrode 102 which is formed over the whole surface of the substrate, and the shaped and processed pixel electrode 105. A method of a liquid crystal display device in which display is enabled by the horizontal electric field between the common electrode 102 and the pixel electrode 105 is called an FFS method.

A reflective-type liquid crystal display device can employ this FFS method. Accordingly, a monitor for a portable electronic device which is capable of a clear display even outdoors can be provided.

A horizontal electric field liquid crystal display device, which is representative of FFS, has the advantage of having a wide viewing angle. Such a device also has the advantage of having a simple structure, due to the fact that an electrode is not formed on the counter substrate side. These advantages distinguish the horizontal electric field liquid crystal display device from liquid crystal display devices in which display is enabled by a vertical electric field.

Embodiment Mode 2

In this embodiment mode, a structure of a horizontal electric field liquid crystal display device which differs to the preceding embodiment mode will be explained.

Figure 2:
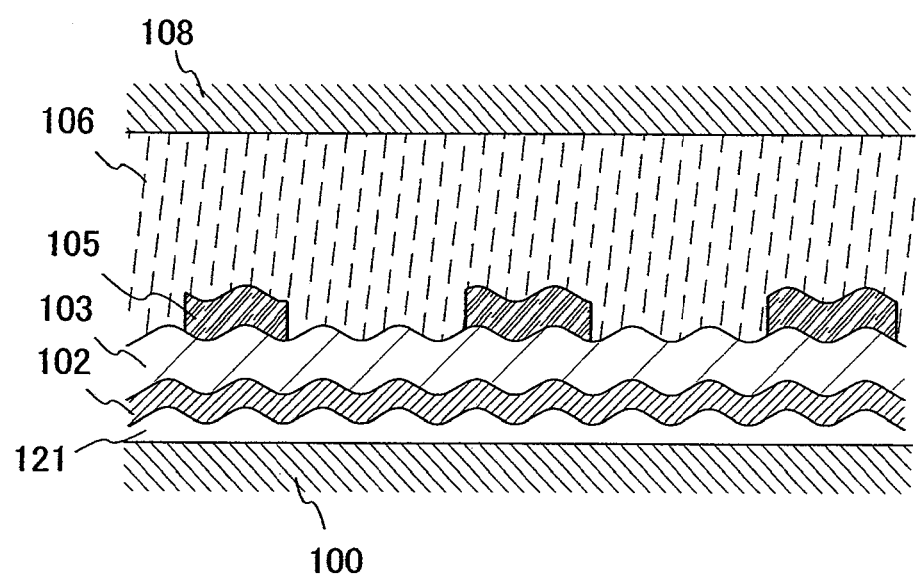
FIG. 2 is a cross-sectional diagram of a liquid crystal display device of the invention.

As shown in FIG. 2, in this embodiment mode, over a common electrode 102 having an uneven shape, an insulating layer 103 which corresponds with the uneven shape is formed. Since the shape of the common electrode 102 having a reflective property is uneven, reflectance can be increased.

Next, a manufacturing process of the uneven shape will be explained. First, over an insulating substrate 100, an insulating layer 121 for forming the uneven shape is formed. An organic material or an inorganic material can be used for the insulating layer 121. As the organic material, a compound such as an acrylic resin, a polyimide resin, a melamine resin, a polyester resin, a polycarbonate resin, a phenolic resin, an epoxy resin, polyacetal, polyether, polyurethane, polyamide (nylon), a furan resin, or a diallyl phthalate resin can be used. As the inorganic resin, silicon oxide or silicon nitride can be used.

Next, the shape of the insulating layer 121 is processed. For example, the shape can be processed by etching using a mask provided over the insulating layer 121. Alternatively, if an organic material is used for the insulating layer 121, an uneven shape having a convex portion is formed by exposure. The uneven shape can be formed by using resist and controlling exposure intensity and exposure time.

For the photoresist, there is a positive type of photoresist. With the positive type, an exposed portion of resist is removed by a developing solution. There is also a negative type of photoresist. With the negative type, an unexposed portion of resist is removed by the developing solution. The uneven shape can be manufactured by using a resist such as one of these. When a positive type resist is used to form the uneven shape, exposure is conducted by irradiating light selectively so that resist remains on a convex portion. Subsequently, the resist can be rounded by conducting heat treatment. Using the rounded resist, the uneven shape can be obtained either by dry etching or wet etching. In order to form the uneven shape in stages, a so-called half-tone technique may be used, in which the resist is exposed in stages in order to control exposure intensity.

The uneven shape formed in the insulating layer 121 has a concave portion and a convex portion. The height of the convex portion is from 0.1 µm to 1 µm, and the interval between the convex portions is from 5 µm to 10 µm. The smaller the interval between convex portions, the greater the number of convex portions and concave portions that can be formed per unit area, thereby increasing reflectance.

The common electrode 102 is formed over the insulating layer 121 having an uneven shape. The common electrode 102 which is extremely thin has an uneven shape which corresponds with the uneven shape of the insulating layer 121. Accordingly, a common electrode with an uneven shape can be formed, and reflectance can be increased.

Over the common electrode 102, the insulating layer 103 which corresponds with the uneven shape is formed. If the film thickness of the insulating layer 103 is small, it can be formed of organic material or inorganic material. Representatively, by forming the insulating layer 103 of inorganic material, it can have an uneven shape. The organic material or inorganic material for forming the insulating layer 103 can be selected from among the materials mentioned in the preceding embodiment mode.

After that, a pixel electrode 105 is also formed so as to corresponds with the uneven shape. By reducing the film thickness of the pixel electrode 105, the pixel electrode 105 can be formed so as to corresponds with the uneven shape. Note that materials and the manufacturing method of the pixel electrode 105 are the same as in the preceding embodiment mode, and the pixel electrode 105 can have a light-transmitting property. The rest of the structure is the same as that of the preceding embodiment mode; an insulating substrate 100, an insulating layer 121, a common electrode 102, an insulating layer 103, a pixel electrode 105 having an uneven shape, a counter substrate 108, and a liquid crystal layer 106 are included. Note that the pixel electrode 105 can be formed of a material having a light-transmitting property or of a material having a reflective property. By forming the pixel electrode 105 of a material having a light-transmitting property, the aperture ratio can be increased. By forming the pixel electrode 105 of a material having a reflective property, reflectance can be increased.

In this way, by also providing the pixel electrode 105 with an uneven shape, reflectance can be increased.

Thus, a reflective-type liquid crystal display device can employ the FFS method. Accordingly, a monitor for a portable electronic device which is capable of a clear display even outdoors can be provided.

Embodiment Mode 3

In this embodiment mode, a structure of a horizontal electric field liquid crystal display device which differs to the previous embodiment modes will be explained.

Figure 3:
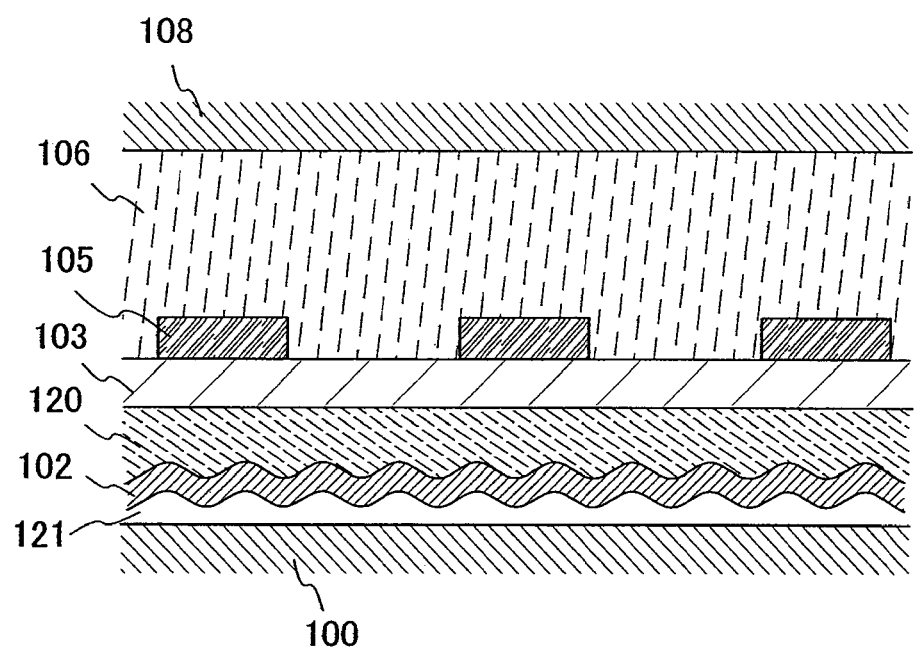
FIG. 3 is a cross-sectional diagram of a liquid crystal display device of the invention.

As shown in FIG. 3, in this embodiment mode, a common electrode 102 has an uneven shape, and a pixel electrode 105 is even. The pixel electrode 105 can be formed of a material having a light-transmitting property or of a material having a reflective property. By forming the pixel electrode 105 of a material having a light-transmitting property, the aperture ratio can be increased. By forming the pixel electrode 105 of a material having a reflective property, reflectance can be increased.

Note that if an electrode is provided with an uneven shape, there is a risk that a disturbance will occur in an electric field applied to a liquid crystal layer. Therefore, over the common electrode 102 having an uneven shape, an insulating layer 120 (hereafter referred to as a planarizing film) which can planarize a surface of the insulating layer 120 may be provided, and the pixel electrode may be formed over the planarizing film 120. Accordingly, the reflectance of the common electrode having a reflective property can be increased, and an appropriate electric field can be applied to the liquid crystal layer by the even pixel electrode 105.

An organic material can be used for the planarizing film 120. As the organic material, an organic compound such as an acrylic resin, a polyimide resin, a melamine resin, a polyester resin, a polycarbonate resin, a phenolic resin, an epoxy resin, polyacetal, polyether, polyurethane, polyamide (nylon), a furan resin, or a diallyl phthalate resin may be used. An inorganic siloxane polymer containing a Si—O—Si bond, which is chosen from among compounds formed of either silicon that is formed with a siloxane polymeric material as a starting material, typified by quartz glass, or oxygen or hydrogen, may also be used. Or, as the organic material, an organic siloxane polymer in which hydrogen bonded to silicon is substituted for an organic group such as methyl or phenyl, which is typified by an alkyl siloxane polymer, an alkyl silsesquioxane polymer, a hydrogenated silsesquioxane polymer, or a hydrogenated alkyl silsesquioxane polymer, may be used. The planarizing film 120 can be formed using such an organic material by an application method, a spin-coating method, a droplet-discharge method, or the like.

Further, an inorganic material may be used for the planarizing film 120. A surface thereof may be polished by a CMP (Chemical Mechanical Polishing) method to make it flat. As the inorganic material, silicon oxide or silicon nitride may be used, for example. Using such an inorganic material, the planarizing film 120 can be formed by a CVD method or by a sputtering method.

A single layer structure or a stacked layer structure can be used for the planarizing film 120. For example, an organic material may be formed, and over that, an inorganic material may be formed. Advantageous effects, namely, improvement of planarization by the organic material and prevention of penetration of impurities by the inorganic material, can be achieved. Further, the inorganic material itself may be stacked in layers. Silicon oxide and silicon nitride can be stacked arbitrarily.

Further, a color filter material can be used for the planarizing film 120. Accordingly, a color filter can be formed on an insulating substrate side, rather than on a counter substrate side. Thereby, positioning arrangement is simplified, a thin type can be obtained, and the number of processing steps can be reduced, to provide a liquid crystal display device that conducts full color display. For the color filter, as above, an arrangement in which RGB cross at right angles or a delta arrangement can be applied. Of course, the color filter may also be formed on the counter substrate 108 side.

The rest of the structure is the same as that described in Embodiment Mode 1, and includes the insulating layer 103 and the pixel electrode 105 which are over the planarizing film 120, and the liquid crystal layer 106, which is sandwiched between the insulating substrate 100 and the counter substrate 108.

In addition to the advantageous effects described in Embodiment Mode 1, the liquid crystal display device of this embodiment mode can have the advantageous effect of having increased reflectance.

Thus, a reflective type liquid crystal display device can be applied to the FFS method. Accordingly, a monitor for a portable electronic device which is capable of clear display even outdoors can be provided.

Embodiment Mode 4

In this embodiment mode, a structure of a horizontal electric field liquid crystal display device which differs to the preceding embodiment modes will be explained.

Figure 4:
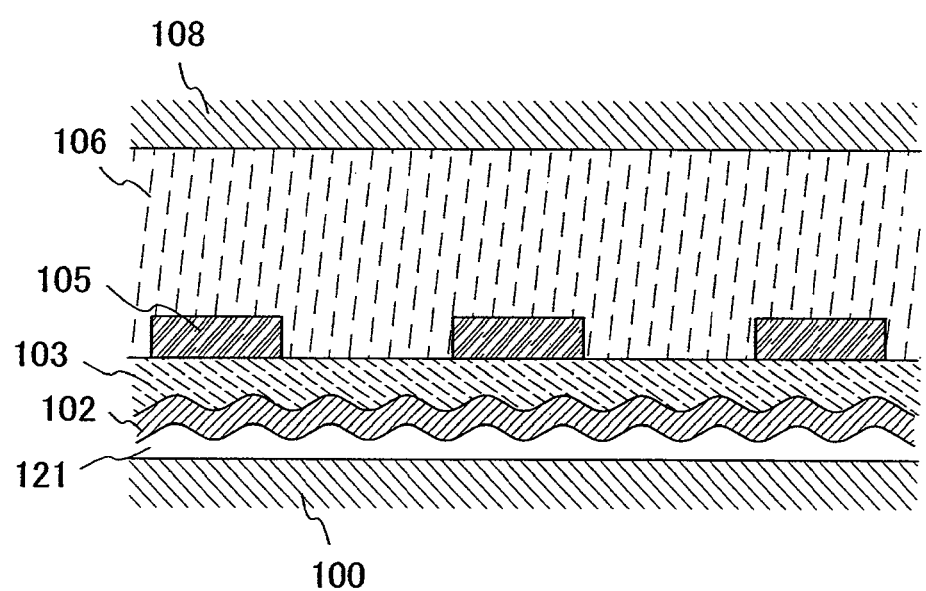
FIG. 4 is a cross-sectional diagram of a liquid crystal display device of the invention.

As shown in FIG. 4, in the structure of this embodiment mode, an insulating layer 103 also has a function of a planarizing film. In order to provide the insulating layer 103 with the function of a planarizing film, an organic material may be used as a material for the insulating layer 103. Furthermore, even if an inorganic material is used for the insulating layer 103, by polishing a surface with a CMP method, it can be made even. Accordingly, there is no need to form a planarizing film 120, and the number of processing steps can be reduced.

The rest of the structure is the same as that of the previous embodiment modes, and includes an insulating layer 121, a common electrode 102, and the insulating layer 103 having a planarizing function, which are over an insulating substrate 100. It also includes a pixel electrode 105 over the insulating layer 103, a liquid crystal layer 106, which is sandwiched between the insulating substrate 100 and the counter substrate 108. The pixel electrode 105 can be formed of a material having a light-transmitting property or of a material having a reflective property. By forming the pixel electrode 105 of a material having a light-transmitting property, an aperture ratio can be increased. By forming the pixel electrode 105 of a material having a reflective property, reflectance can be increased.

Further, similarly to the structure described in the preceding embodiment mode, the structure of this embodiment mode improves evenness. Accordingly, disturbance of an electric field between the common electrode and the pixel electrode can be suppressed.

Thus, by providing the insulating layer 103 with a function of a planarizing film, the need to form a planarizing film disappears, and the number of processing steps can be reduced. Accordingly, the mass productivity of the liquid crystal display device can be increased. Of course, reflectance can be increased by the common electrode 102 having an uneven shape.

Embodiment Mode 5

In this embodiment mode, a structure of a horizontal electric field liquid crystal display device which differs to that in the preceding embodiment modes will be explained.

Figure 5:
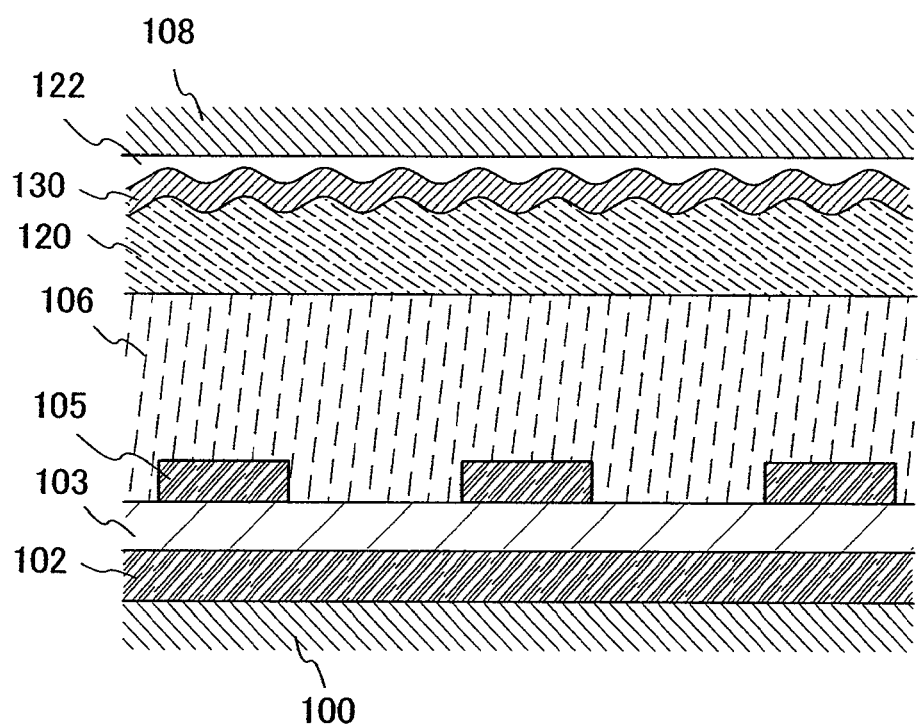
FIG. 5 is a cross-sectional diagram of a liquid crystal display device of the invention.

As shown in FIG. 5, in this embodiment mode, an electrode 130 (hereafter referred to as a counter electrode) on a counter substrate 108 side has an uneven shape. Specifically, an insulating layer 122 having an uneven shape is formed over the counter substrate 108, and the counter electrode 130 is formed over the insulating layer 122. The insulating layer 122 having an uneven shape can be formed in the same manner as the insulating layer 121 of a previous embodiment mode.

Subsequently, a planarizing film 120 may be formed over the counter electrode 130, in order to increase evenness. The planarizing film 120 can be manufactured in the same manner as the planarizing film in a previous embodiment mode. In a case where the counter electrode 130 has an uneven shape, there is a risk of a disturbance occurring in an electric field applied to a liquid crystal layer 106. However this can be prevented by the planarizing film 120.

The rest of the structure is the same as that of above embodiment modes. A common electrode 102, an insulating layer 103, and a pixel electrode 105 are formed over an insulating substrate 100. Note that if the counter electrode 130 is provided with a reflective property, display is seen on the insulating substrate 100 side of the liquid crystal display device, so it is preferable to use a light-transmitting material for the common electrode 102 and the pixel electrode 105.

In this way, a counter electrode can be formed in an FFS liquid crystal display device, and the counter electrode can be provided with an uneven shape. Further, by using a conductive layer having a reflective property as the counter electrode, that is, by using a reflective electrode as the counter electrode, a liquid crystal display device with high reflectiveness can be provided. Furthermore, by controlling the counter electrode, a horizontal electric field and a vertical electric field can be applied to a liquid crystal layer, and the liquid crystal layer can be controlled from various directions.

Embodiment Mode 6

In this embodiment mode, a structure of a horizontal electric field liquid crystal display device which differs to the preceding embodiment modes will be explained.

Figure 6:
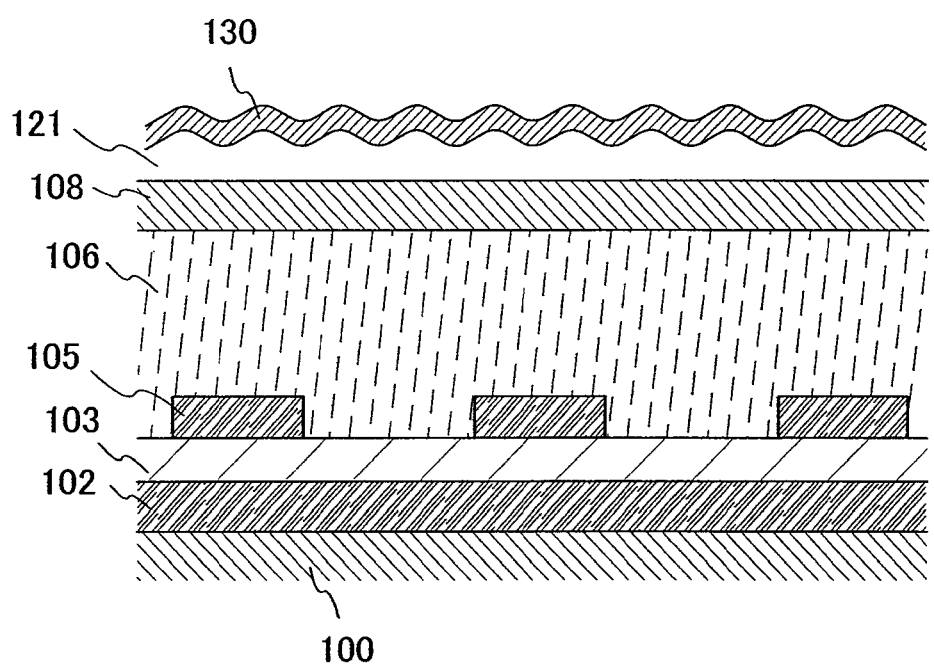
FIG. 6 is a cross-sectional diagram of a liquid crystal display device of the invention.

In this embodiment mode, as shown in FIG. 6, a counter electrode 130 is provided on an opposite side to that of a liquid crystal layer 106. That is, the counter electrode 130 is provided so as not to be in contact with the liquid crystal layer 106. The rest of the structure is the same as the previous embodiment modes. Over an insulating substrate 100, there is a common electrode 102, an insulating layer 103, a pixel electrode 105, and the liquid crystal layer 106, which is sandwiched between the insulating substrate 100 and the counter substrate 108.

By providing the counter electrode 130 on the opposite side to that of the liquid crystal layer 106, a reflective film can be provided without disturbance to an electric field which is applied to liquid crystal, and advantageous effects such as shielding from an external electric field, for example static electricity, can be obtained. Further, similarly to the preceding embodiment modes, a liquid crystal display device with high reflectiveness can be provided.

Embodiment Mode 7

In this embodiment mode, a structure of a horizontal electric field liquid crystal display device which differs to that in the previous embodiment modes will be explained.

Figure 7:
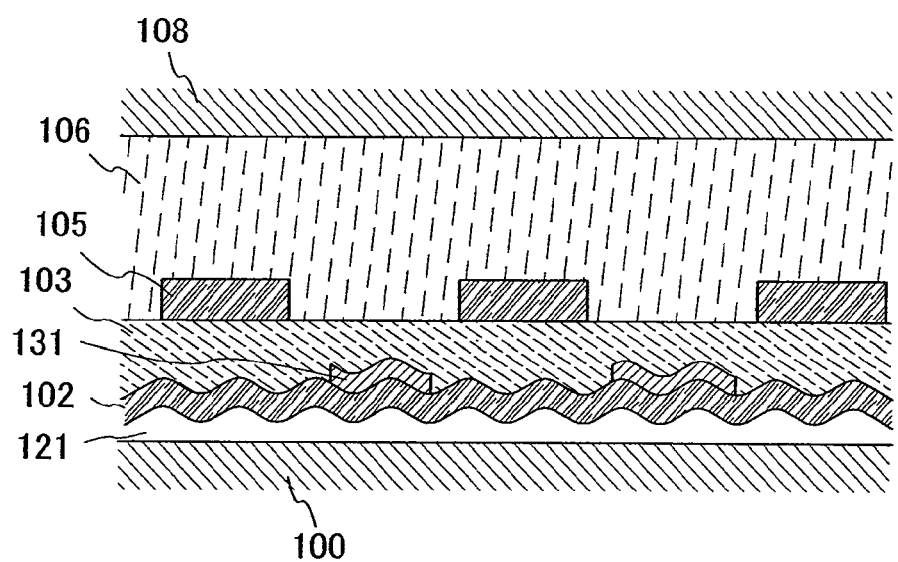
FIG. 7 is a cross-sectional diagram of a liquid crystal display device of the invention.

As shown in FIG. 7, in this embodiment mode, a reflective electrode 131 is provided over a common electrode 102 having an uneven shape. The reflective electrode 131 is formed selectively. The reflective electrode 131 is formed such that it is arranged in a portion of a pixel. The common electrode 102 is formed of a light-transmitting material. Thus, a semi-transmissive liquid crystal display device having a common electrode 102 formed of a light-transmitting material and a selectively formed reflective electrode 131 is formed. By changing the size of the selectively formed reflective electrode 131, that is, by changing the intervals or height of the uneven shape of the selectively formed reflective electrode 131, reflectance can be controlled. For example, by making the interval between uneven shapes narrower and increasing the number of uneven shapes per unit area, the amount of surface area that reflects can be increased, thereby increasing reflectance. Furthermore, a pixel electrode 105 can be formed of a reflective material, and thereby, reflectance can be increased.

The rest of the structure is the same as the above embodiment modes, and includes an insulating layer 121, the common electrode 102 having an uneven shape, the selectively formed reflective electrode 131, and an insulating layer 103 having a planarizing function, which are over an insulating substrate 100. Also included are a pixel electrode 105, and a liquid crystal layer 106, which is sandwiched between the insulating substrate 100 and the counter substrate 108.

Since the common electrode 102 and the reflective electrode 131 are electrically connected, they have the same potential. As a result, the potential of the reflective electrode 131 can be controlled, and unnecessary voltage resulting from static electricity or the like is not applied to the liquid crystal layer 106.

Thus, a semi-transmissive liquid crystal display device including a selectively formed reflective electrode 131, a common electrode 102 formed of a light-transmitting material, and a pixel electrode 105, is formed. A semi-transmissive liquid crystal display device such as this can conduct display indoors with a backlight, and can conduct display outdoors by using the reflective electrode.

Embodiment Mode 8

In this embodiment mode, a structure of a horizontal electric field liquid crystal display device which differs to the previous embodiment modes will be explained.

Figure 8:
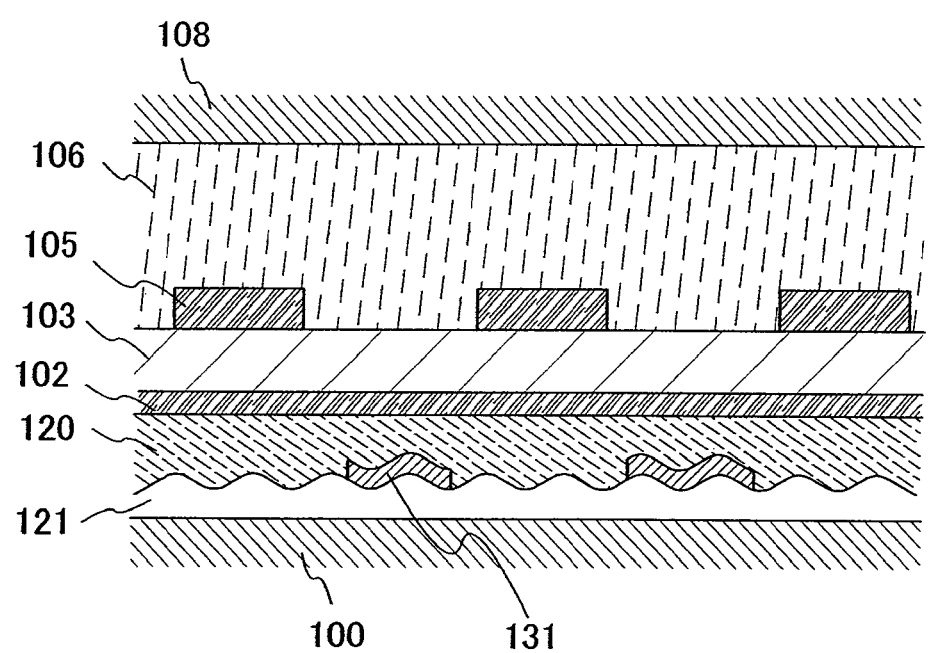
FIG. 8 is a cross-sectional diagram of a liquid crystal display device of the invention.

As shown in FIG. 8, in this embodiment mode, a reflective electrode 131 is formed selectively over an insulating layer 121 having an uneven shape. The reflective electrode 131 is formed so as to corresponds with the uneven shape. Here, in order to prevent disturbance of an electric field, a planarizing film 120 may be provided. For a manufacturing method and the like of the planarizing film 120, a previous embodiment mode can be referred to. The reflective electrode 131 is formed so as to be arranged in a portion of a pixel. Note that in order to form a semi-transmissive liquid crystal display device, a common electrode 102 is formed of a light-transmitting material. Further, a pixel electrode 105 can be formed of a reflective material, and thereby reflectance can be increased.

The rest of the structure is the same as that of structures in previous embodiment modes, and includes the insulating layer 121, the reflective electrode 131, the planarizing film 120, the common electrode 102, an insulating layer 103, and the pixel electrode 105, which are over an insulating substrate 100. The structure also includes a liquid crystal layer 106 which is sandwiched between the insulating substrate 100 and the counter substrate 108. The pixel electrode 105 can be formed of a material having a light-transmitting property or of a material having a reflective property. By forming the pixel electrode 105 from a material having a light-transmitting property, an aperture ratio can be increased. By forming the pixel electrode 105 of a material having a reflective property, reflectance can be increased.

Thus, a semi-transmissive liquid crystal display device including a selectively formed reflective electrode 131, a common electrode 102 formed of a light-transmitting material, and a pixel electrode 105, is formed. A semi-transmissive liquid crystal display device such as this can conduct display indoors by using a backlight, and can conduct display outdoors by using the reflective electrode.

Embodiment Mode 9

In this embodiment mode, explanation of an example of a top view of a pixel of a liquid crystal display device is given.

Figure 9:
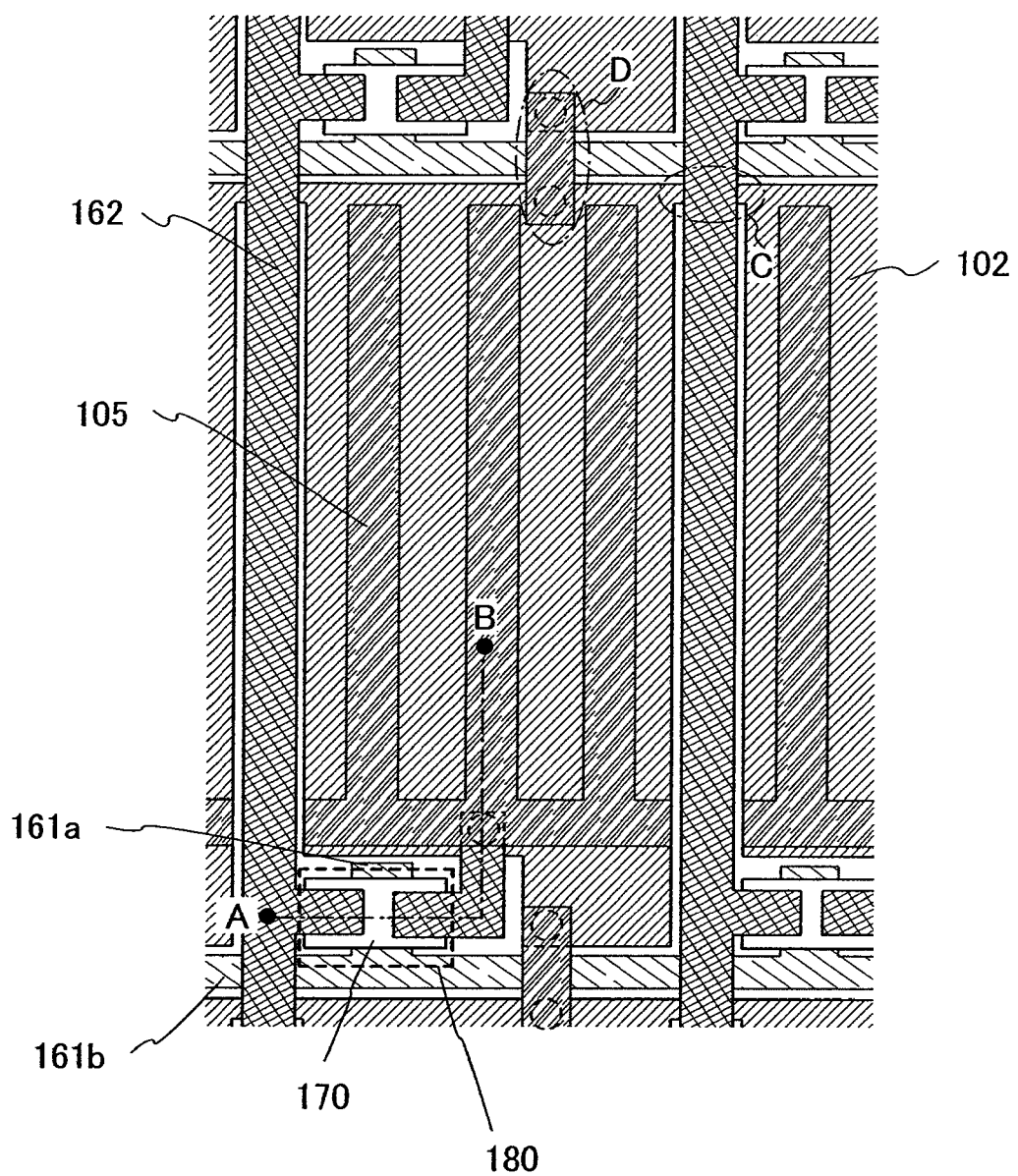
FIG. 9 is a top view of a liquid crystal display device of the invention.

In FIG. 9, a top view of a pixel having a thin film transistor (a TFT) as a switching element is shown. A TFT 180 is electrically connected to a pixel electrode 105. For example, a source electrode or a drain electrode of the TFT is connected to the pixel electrode 105 through a contact hole. A source signal line 162 is formed by shaping a conductive layer of the same material as the source electrode and the drain electrode.

Further, the TFT 180 has a gate electrode 161a and a semiconductor layer 170. A gate signal line 161b which inputs a signal to the gate electrode 161a can be formed by shaping a conductive layer of the same material as the gate electrode 161a. The gate signal line 161b is arranged so as to be in a grid-like pattern with the source signal line 162.

A common electrode 102 is formed over the same layer as the gate electrode 161a and the gate signal line 161b. That is, the gate electrode 161a and the gate signal line 161b are formed over the same insulating layer as the common electrode 102. However, the gate electrode 161a and the gate signal line 161b are not electrically connected to the common electrode 102. This is because the common electrode 102 is generally applied with a different voltage to that of the gate electrode. In a source signal line 162 direction, adjoining common electrodes 102 are connected through a wire (see Region C). In a gate signal line 161b direction, adjoining common electrodes 102 are connected through a wire via contact holes (see Region D). As shown in Region D, the wire can be formed by shaping a conductive layer of the same material as the pixel electrode 105. In this way, common electrodes 102 of all the pixels can be made to have the same potential.

Since an electrode with high reflectiveness is used in such a pixel, a display which is clear even outdoors can be provided.

Embodiment Mode 10

In this embodiment mode, a top view which is different to the preceding embodiment mode will be explained.

Figure 10:
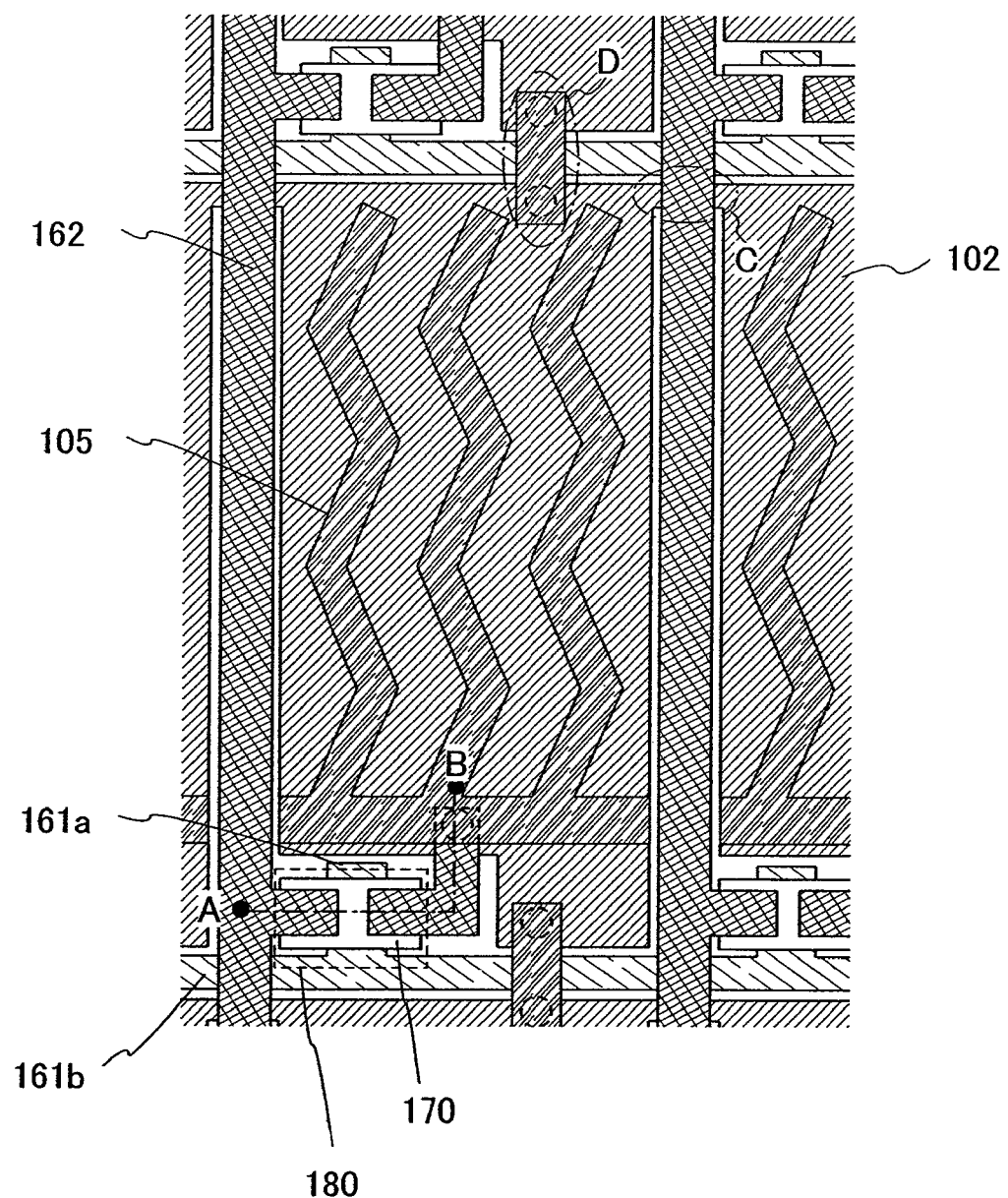
FIG. 10 is a top view of a liquid crystal display device of the invention.

A pixel shown in FIG. 10 differs to the preceding embodiment mode in that a top surface of a pixel electrode 105 has a rectangular shape. The rest of the structure is the same as the preceding embodiment mode. A 'rectangular shape' refers to a shape that zigzags repeatedly at a set angle, or to a so-called zigzag shape, as shown in FIG. 10. The set angle is an obtuse angle in this embodiment mode, and the number of angles can be determined according to the area of the pixel.

Making the top surface of the pixel electrode 105 a rectangular shape in this way is desirable, since by doing so, the viewing angle can be widened even further. This is because liquid crystal molecules exist along both a first direction and a second direction of the rectangular-shaped pixel electrode.

In order to obtain a similar advantageous effect, a pixel may have a form in which it is divided into two regions from the center section of the pixel. In a first region, a linearly-shaped pixel electrode is arranged at a set angle, and in a second region, a linearly-shaped pixel electrode is arranged such that the center section of the pixel is a line of symmetry.

Further, in order to obtain a similar advantageous effect, rather than arranging a linearly-shaped pixel electrode, a pixel may have a form in which a conductive layer which functions as a pixel electrode is formed over the whole surface of the pixel. In a first region, a linear aperture portion is formed at a set angle, and in a second region, a linear aperture portion is formed with a center section as a line of symmetry.

Since an electrode with high reflectiveness is used in such a pixel, a display which is clear even outdoors can be provided.

Embodiment Mode 11

In this embodiment mode, a cross-sectional diagram of a pixel including a thin film transistor will be explained. Note that in this embodiment mode, a thin film transistor has a bottom-gate structure having an amorphous semiconductor layer.

Figure 11:
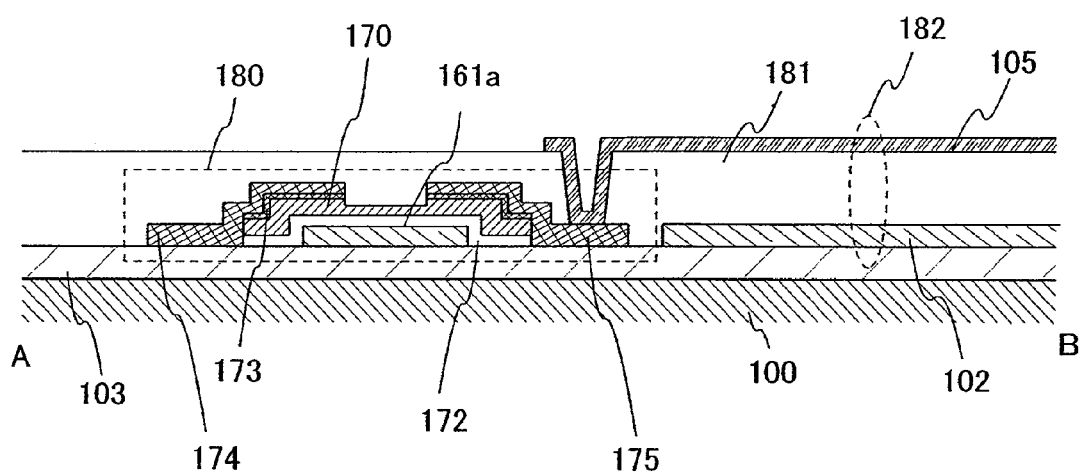
FIG. 11 is a cross-sectional diagram of a liquid crystal display device of the invention.

A pixel shown in FIG. 11 corresponds to a cross-section taken along a line A to B in FIG. 9. Over an insulating substrate 100, a TFT 180 and a common electrode 102 are provided, with an insulating layer 103, which also functions as a base, interposed therebetween. The TFT 180 includes a semiconductor layer 170 and a gate electrode 161a. This embodiment mode describes a TFT using an amorphous silicon layer. Therefore, the TFT further includes a gate insulating layer 172 covering the gate electrode 161a, a semiconductor layer 170, and an n-type impurity layer 173 which is over the semiconductor layer 170. Also included are a source electrode 174 and a drain electrode 175 which are in contact with the n-type impurity layer. An inorganic insulating material, for example silicon oxide or silicon nitride, can be used for the gate insulating layer. The gate insulating layer can have a single layer structure or a stacked layer structure of the above materials. The gate electrode can be formed of the same material as a gate signal line.

Further, as a TFT having an amorphous semiconductor layer, there is a channel etch type that has a channel portion that is partly etched, as shown in FIG. 11, and a channel protection type, in which a protective film is provided on a channel portion. By forming a protective film covering such a TFT, penetration of impurities and deterioration of the TFT's electrical properties over time can be prevented. Particularly in a case where the channel etch type is used, since the channel portion is exposed, it is preferable to form a protective film. A silicon film containing nitrogen, that is, a silicon nitride film or a silicon oxynitride film, may be used as such a protective film.

An insulating layer 181 that covers the TFT 180 and the common electrode 102 is provided, and a pixel electrode 105 is provided over the insulating layer 181. Further, a capacitor 182 is formed with the common electrode 102, the insulating layer 181, and the pixel electrode 105. Therefore, in a pixel of a liquid crystal display device of the invention, a region which functions as a capacitor can be obtained without providing a capacitor element.

The insulating layer 181 can be formed of an organic material, an inorganic insulating material, or an insulator which contains a Si—O—Si bond and which is formed of a siloxane-based material (hereafter, referred to as a siloxane-based insulator). Note that siloxane has a skeletal structure formed from a bond of silicon (Si) and oxygen (O). As a substituent, an organic group containing at least hydrogen (for example, an alkyl group or an aromatic hydrocarbon) is used. A fluoro group may also be used as a substituent. Alternatively, an organic group containing at least hydrogen and a fluoro group may be used as substituents. Further, a material that is called a low-dielectric constant material (a low-k material) may be used for the insulating layer 181.

The pixel electrode of this embodiment mode can have the shape described in Embodiment Mode 9, or the shape described in Embodiment Mode 10.

Because an electrode with high reflectiveness is used in a pixel such as this, a clear display can be provided even outdoors.

Embodiment Mode 12

In this embodiment mode, a cross-sectional diagram that differs to the one in the preceding embodiment mode will be explained.

Figure 12:
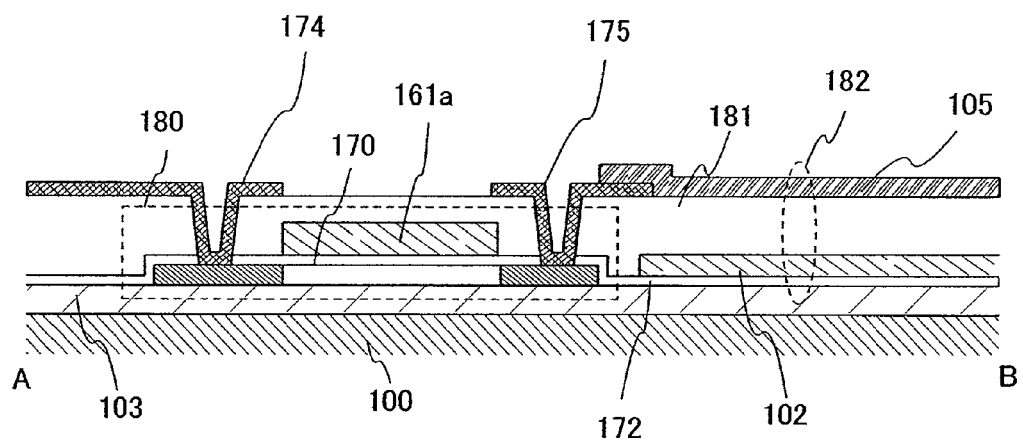
FIG. 12 is a cross-sectional diagram of a liquid crystal display device of the invention.

A pixel shown in FIG. 12 differs to the previous embodiment mode in that a TFT has a top-gate structure having a crystalline semiconductor layer. The rest of the structure, which includes a gate electrode 161a, a gate insulating layer 172, and a source electrode 174 and a drain electrode 175, can be manufactured using the same materials as in the previous embodiment modes.

Next, explanation concerning the crystalline semiconductor layer will be given. First, a crystalline semiconductor layer having a thickness of 10 to 200 nm which is separated into an island shape is formed. The semiconductor layer may be a microcrystalline semiconductor layer instead of a crystalline semiconductor layer. As a material for the semiconductor layer, silicon or a mixture of silicon and germanium may be used. As a manufacturing method for the crystalline semiconductor layer, for example, there is a method in which an amorphous semiconductor layer is formed, then crystallized by heat treatment to form a crystalline semiconductor layer. For the heat treatment, a heating furnace, laser irradiation, irradiation using light emitted from a lamp instead of a laser beam (hereafter referred to as lamp annealing), or a combination of these methods can be used.

In a case where laser irradiation is used, a continuous wave laser (a CW laser) or a pulsed oscillation laser (a pulsed laser) can be used.

Further, an incident angle θ of the laser may be set so as to satisfy 0°<θ<90° with respect to the semiconductor layer. As a result, interference of a laser beam can be prevented.

Further, irradiation may be conducted with a fundamental wave of a continuous wave laser beam and a harmonic of a continuous wave laser beam, or with a fundamental wave of a continuous wave laser beam and a harmonic of a pulsed laser beam. By irradiating with a plurality of laser beams, energy can be supplemented.

Further, a pulsed oscillation laser may be used, and a laser beam may be oscillated at a cyclic frequency at which after the semiconductor layer is melted by a laser beam, the laser beam of the next pulse can irradiate the semiconductor layer before it hardens again. Accordingly, crystal grains grown continuously in a scanning direction can be obtained. That is, a pulsed beam whose minimum cyclic frequency is determined such that a pulse oscillation cycle is shorter than the time it takes for the semiconductor layer to completely harden again after having melted, can be used. A pulsed beam oscillation frequency which can actually be used is 10 MHz or more, so a frequency band which is used is considerably higher than the frequency band of several tens to several hundreds of Hz which is generally used.

As another heat treatment, in a case where a heating furnace is used, an amorphous semiconductor layer is heated for 2 to 20 hours at 500 to 550° C. At this time, the temperature may be set at multiple stages in the range of 500 to 550° C. so that the temperature rises gradually. Due to a first low-temperature heat step, hydrogen and the like comes out of the amorphous semiconductor layer. Therefore, so-called dehydrogenation, which decreases roughening of the film at the time of crystallization, can be conducted. In addition, it is desirable to form a metal element that promotes crystallization, for example Ni, over the amorphous semiconductor layer, as this can lower the heating temperature. Even with crystallization using such a metal element, heating may be conducted at 600 to 950° C.

However, in a case where a metal element is formed, since there is a concern that an electrical property of a semiconductor element could be adversely impacted, the need to perform gettering in order to reduce or remove the metal element arises. For example, a step in which the amorphous semiconductor layer is used as a gettering sink to capture the metal element may be performed.

In addition, a gate insulating layer covering the semiconductor layer, a gate electrode, and an insulating layer 181 which is provided over the gate electrode are provided in the TFT 180.

When impurity regions are formed in a semiconductor layer 170 such as this, a channel forming region is formed between the impurity regions. The TFT can have a single drain structure in which the semiconductor layer has only high-concentration impurity regions, or it can have an LDD (lightly doped drain) structure, in which the semiconductor layer has low-concentration impurity regions and high-concentration impurity regions.

Thus, a TFT having a crystalline semiconductor layer can be formed. Subsequently, to electrically connect the impurity regions and a pixel electrode 105, a contact hole is formed in the insulating layer 181.

The pixel electrode in this embodiment mode can have the shape described shown in Embodiment Mode 9 or Embodiment Mode 10.

Embodiment Mode 13

Examples of an electronic device employing a liquid crystal display device of the invention which can be given include a television device (a television, a television receiver), a digital camera, a digital video camera, a cellular phone unit (a cellular phone handset), a handheld terminal such as a PDA, a portable game machine, a monitor, a computer, a sound reproduction device such as a car audio device, an image reproducing device equipped with a recording medium, such as a home-use game machine, and the like. Some specific examples will be explained, with reference to FIGS. 13A to 13E.

Figure 13A:
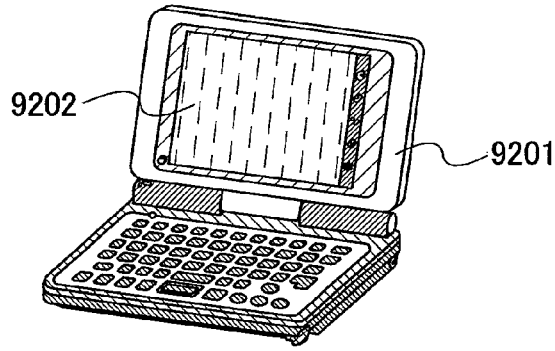
FIGS. 13A to 13E show electronic devices employing a liquid crystal display device of the invention.

A handheld terminal employing a liquid crystal display device of the invention shown in FIG. 13A includes a body 9201, a display portion 9202, and the like. According to the invention, a handheld terminal which can efficiently reflect natural light and conduct a clear display outdoors can be provided.

Figure 13B:
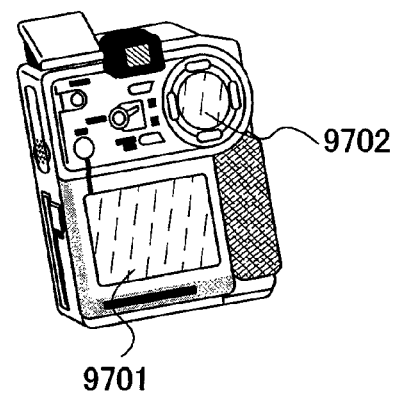

A digital video camera employing a liquid crystal display device of the invention shown in FIG. 13B includes display portions 9701 and 9702, and the like. According to the invention, a digital video camera which can efficiently reflect natural light and conduct a clear display outdoors can be provided.

Figure 13C:
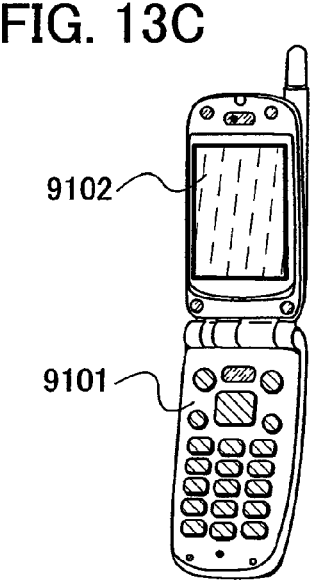

A portable terminal employing a liquid crystal display device of the invention shown in FIG. 13C includes a body 9101, a display portion 9102, and the like. According to the invention, a portable terminal which can efficiently reflect natural light and conduct a clear display outdoors can be provided.

Figure 13D:
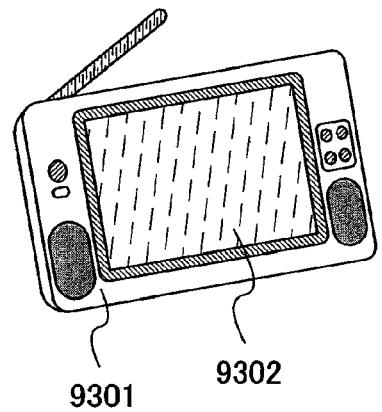

A portable television device employing a liquid crystal display device of the invention shown in FIG. 13D includes a body 9301, a display portion 9302, and the like. According to the invention, a portable television device which can efficiently reflect natural light and conduct a clear display outdoors can be provided.

Figure 13E:
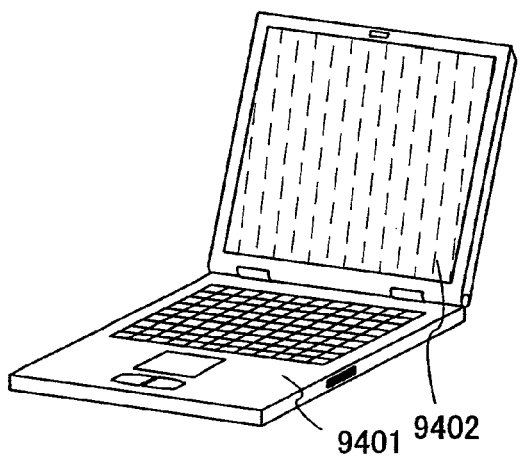

A portable computer employing a liquid crystal display device of the invention shown in FIG. 13E includes a body 9401, a display portion 9402, and the like. According to the invention, a portable computer which can efficiently reflect natural light and conduct a clear display outdoors can be provided.

As described above, a display device of the invention can be applied to all kinds of electronic devices.

This application is based on Japanese Patent Application serial no. 2005303756 filed in Japan Patent Office on 18 Oct. 2005, the entire contents of which are hereby incorporated by reference.

What is claimed is:

1. A liquid crystal display device, comprising:
    a liquid crystal layer comprising liquid crystal molecules and sandwiched between a pair of substrates which are disposed opposite each other;
    over one of the pair of substrates, a light-reflective common electrode, a light-transmissive pixel electrode which is provided over the light-reflective common electrode with an insulating layer interposed therebetween, and a transistor comprising a gate signal line; and
    a wiring overlapping with the gate signal line and over the gate signal line and the light-reflective common electrode, wherein the wiring is electrically connected to the light-reflective common electrode,
    wherein the light-reflective common electrode and the gate signal line are provided on a same insulating surface,
    wherein an entirety of the light-transmissive pixel electrode overlaps the light-reflective common electrode,
    wherein the transistor is electrically connected to the light-transmissive pixel electrode through a contact hole, and
    wherein the contact hole overlaps with the light-reflective common electrode.

2. A liquid crystal display device, comprising:
    a liquid crystal layer comprising liquid crystal molecules and sandwiched between a pair of substrates which are disposed opposite each other; and
    over one of the pair of substrates, a light-reflective common electrode and a light-transmissive pixel electrode which is provided over the light-reflective common electrode with a first insulating layer interposed therebetween, and a transistor comprising a gate signal line; and
    a wiring overlapping with the gate signal line and over the gate signal line and the light-reflective common electrode, wherein the wiring is electrically connected to the light-reflective common electrode,
    wherein the light-reflective common electrode is provided over a second insulating layer having an uneven shape,
    wherein a surface of the light-reflective common electrode has a shape which corresponds with the uneven shape,
    wherein the first insulating layer has a flat surface,
    wherein the light-transmissive pixel electrode is provided on the flat surface of the first insulating layer,
    wherein an entirety of the light-transmissive pixel electrode overlaps the light-reflective common electrode,
    wherein the transistor is electrically connected to the light-transmissive pixel electrode through a contact hole, and
    wherein the contact hole overlaps with the light-reflective common electrode.

3. A liquid crystal display device, comprising:
    a liquid crystal layer comprising liquid crystal molecules and sandwiched between a pair of substrates which are disposed opposite each other; and over one of the pair of substrates, a light-reflective common electrode and a light-transmissive pixel electrode which is provided over the light-reflective common electrode with a first insulating layer interposed therebetween, a transistor comprising a gate signal line; and a wiring overlapping with the gate signal line and over the gate signal line and the light-reflective common electrode, wherein the wiring is electrically connected to the light-reflective common electrode, wherein the light-reflective common electrode is provided over a second insulating layer having an uneven shape, wherein a surface of the light-reflective common electrode has a shape which corresponds with the uneven shape of the second insulating layer, wherein a planarizing film comprising a third insulating layer is formed over the light-reflective common electrode, wherein the first insulating layer is formed over the third insulating layer, wherein the first insulating layer has a flat surface, wherein the light-transmissive pixel electrode is provided on the flat surface of the first insulating layer, wherein an entirety of the light-transmissive pixel electrode overlaps the light-reflective common electrode, wherein the transistor is electrically connected to the light-transmissive pixel electrode through a contact hole, and wherein the contact hole overlaps with the light-reflective common electrode.

4. A liquid crystal display device, comprising:

a liquid crystal layer comprising liquid crystal molecules and sandwiched between a pair of substrates which are disposed opposite each other;

over one of the pair of substrates, a light-transmissive common electrode, a light-transmissive pixel electrode which is provided over the light-transmissive common electrode with a first insulating layer interposed therebetween, and a transistor comprising a gate signal line;

a reflective electrode which is on a side of the other substrate, where the liquid crystal layer is not provided; and a wiring overlapping with the gate signal line and over the gate signal line and the light-transmissive common electrode, wherein the wiring is electrically connected to the light-transmissive common electrode, wherein the reflective electrode is provided over a second insulating layer having an uneven shape, wherein a surface of the reflective electrode has a shape which corresponds with the uneven shape, wherein the light-transmissive common electrode and the gate signal line are provided on a same insulating surface, wherein the transistor is electrically connected to the light-transmissive pixel electrode through a contact hole, and wherein the contact hole overlaps with the light-transmissive common electrode.

5. A liquid crystal display device, comprising:

a liquid crystal layer comprising liquid crystal molecules and sandwiched between a pair of substrates which are disposed opposite each other;

over one of the pair of substrates, a light-transmissive common electrode, a light-transmissive pixel electrode which is provided over the light-transmissive common electrode with a first insulating layer interposed therebetween, a transistor comprising a gate signal line;

a reflective electrode which is on a side of the other substrate, where the liquid crystal layer is provided; and a wiring overlapping with the gate signal line and over the gate signal line and the light-transmissive common electrode, wherein the wiring is electrically connected to the light-transmissive common electrode, wherein the reflective electrode is provided over a second insulating layer having an uneven shape, wherein a surface of the reflective electrode has a shape which corresponds with the uneven shape, wherein a planarizing film comprising a third insulating layer is formed over the reflective electrode, wherein the light-transmissive common electrode and the gate signal line are provided on a same insulating surface, wherein the transistor is electrically connected to the light-transmissive pixel electrode through a contact hole, and wherein the contact hole overlaps with the light-transmissive common electrode.

6. A liquid crystal display device, comprising:

a liquid crystal layer comprising liquid crystal molecules and sandwiched between a pair of substrates which are disposed opposite each other; and over one of the pair of substrates, a light-transmissive common electrode, a reflective electrode on the light-transmissive common electrode, a light-transmissive pixel electrode which is provided above the reflective electrode with a first insulating layer interposed therebetween, and a transistor comprising a gate signal line; and a wiring overlapping with the gate signal line and over the gate signal line and the light-transmissive common electrode, wherein the wiring is electrically connected to the light-transmissive common electrode, wherein the light-transmissive common electrode is provided over a second insulating layer having an uneven shape, wherein a surface of the light-transmissive common electrode has a shape which corresponds with the uneven shape, wherein a surface of the reflective electrode has a shape which corresponds with the uneven shape, wherein the first insulating layer has a flat surface, wherein the light-transmissive pixel electrode is provided on the flat surface of the first insulating layer, wherein the reflective electrode does not overlap the light-transmissive pixel electrode, wherein the transistor is electrically connected to the light-transmissive pixel electrode through a contact hole, and wherein the contact hole overlaps with the light-transmissive common electrode.

7. A liquid crystal display device, comprising:

a liquid crystal layer comprising liquid crystal molecules and sandwiched between a pair of substrates which are disposed opposite each other; and over one of the pair of substrates, a reflective electrode, a light-transmissive common electrode which is provided over the reflective electrode with a first insulating layer interposed between, a light-transmissive pixel electrode which is provided over the light-transmissive common electrode with a second insulating layer interposed therebetween, and a transistor comprising a gate signal line; and a wiring overlapping with the gate signal line and over the gate signal line and the light-transmissive common electrode, wherein the wiring is electrically connected to the light-transmissive common electrode, wherein the reflective electrode is provided over a third insulating layer having an uneven shape, wherein a surface of the reflective electrode has a shape which corresponds with the uneven shape, wherein the first insulating layer is a planarizing film,
wherein the light-transmissive common electrode and the gate signal line are provided on a same insulating surface,
wherein the transistor is electrically connected to the light-transmissive pixel electrode, through a contact hole and
wherein the contact hole overlaps with the light-transmissive common electrode.

8. The liquid crystal display device according to claim 1, wherein the light-transmissive pixel electrode is formed of ITO.

9. The liquid crystal display device according to claim 2, wherein the light-transmissive pixel electrode is formed of ITO.

10. The liquid crystal display device according to claim 3, wherein the light-transmissive pixel electrode is formed of ITO.

11. The liquid crystal display device according to claim 4, wherein the light-transmissive pixel electrode is formed of ITO.

12. The liquid crystal display device according to claim 5, wherein the light-transmissive pixel electrode is formed of ITO.

13. The liquid crystal display device according to claim 6, wherein the light-transmissive pixel electrode is formed of ITO.

14. The liquid crystal display device according to claim 7, wherein the light-transmissive pixel electrode is formed of ITO.

15. The liquid crystal display device according to claim 1, wherein a transistor is connected to the light-transmissive pixel electrode.

16. The liquid crystal display device according to claim 2, wherein a transistor is connected to the light-transmissive pixel electrode.

17. The liquid crystal display device according to claim 3, wherein a transistor is connected to the light-transmissive pixel electrode.

18. The liquid crystal display device according to claim 4, wherein a transistor is connected to the light-transmissive pixel electrode.

19. The liquid crystal display device according to claim 5, wherein a transistor is connected to the light-transmissive pixel electrode.

20. The liquid crystal display device according to claim 6, wherein a transistor is connected to the light-transmissive pixel electrode.

21. The liquid crystal display device according to claim 7, wherein a transistor is connected to the light-transmissive pixel electrode.

22. The liquid crystal display device according to claim 6, wherein the light-transmissive pixel electrode is provided so as not to overlap with the reflective electrode.

23. The liquid crystal display device according to claim 1, wherein the liquid crystal layer is configured to be driven by a horizontal electric field method in which an electric field is generated between the light-reflective common electrode and the light-transmissive pixel electrode.

24. The liquid crystal display device according to claim 2, wherein the liquid crystal layer is configured to be driven by a horizontal electric field method in which an electric field is generated between the light-reflective common electrode and the light-transmissive pixel electrode.

25. The liquid crystal display device according to claim 3, wherein the liquid crystal layer is configured to be driven by a horizontal electric field method in which an electric field is generated between the light-reflective common electrode and the light-transmissive pixel electrode.

26. The liquid crystal display device according to claim 4, wherein the liquid crystal layer is configured to be driven by a horizontal electric field method in which an electric field is generated between the light-transmissive common electrode and the light-transmissive pixel electrode.

27. The liquid crystal display device according to claim 5, wherein the liquid crystal layer is configured to be driven by a horizontal electric field method in which an electric field is generated between the light-transmissive common electrode and the light-transmissive pixel electrode.

28. The liquid crystal display device according to claim 6, wherein the liquid crystal layer is configured to be driven by a horizontal electric field method in which an electric field is generated between the light-transmissive common electrode and the light-transmissive pixel electrode.

29. The liquid crystal display device according to claim 7, wherein the liquid crystal layer is configured to be driven by a horizontal electric field method in which an electric field is generated between the light-transmissive common electrode and the light-transmissive pixel electrode.

30. The liquid crystal display device according to claim 1,
wherein the wiring overlaps with the gate signal line in a direction substantially perpendicular to a surface of the one of the pair of substrates, and
wherein the surface faces the other of the pair of substrates.

31. The liquid crystal display device according to claim 2,
wherein the wiring overlaps with the gate signal line in a direction substantially perpendicular to a surface of the one of the pair of substrates, and
wherein the surface faces the other of the pair of substrates.

32. The liquid crystal display device according to claim 3,
wherein the wiring overlaps with the gate signal line in a direction substantially perpendicular to a surface of the one of the pair of substrates, and
wherein the surface faces the other of the pair of substrates.

33. The liquid crystal display device according to claim 4,
wherein the wiring overlaps with the gate signal line in a direction substantially perpendicular to a surface of the one of the pair of substrates, and
wherein the surface faces the other of the pair of substrates.

34. The liquid crystal display device according to claim 5,
wherein the wiring overlaps with the gate signal line in a direction substantially perpendicular to a surface of the one of the pair of substrates, and
wherein the surface faces the other of the pair of substrates.

35. The liquid crystal display device according to claim 6,
wherein the wiring overlaps with the gate signal line in a direction substantially perpendicular to a surface of the one of the pair of substrates, and
wherein the surface faces the other of the pair of substrates.

36. The liquid crystal display device according to claim 7,
wherein the wiring overlaps with the gate signal line in a direction substantially perpendicular to a surface of the one of the pair of substrates, and
wherein the surface faces the other of the pair of substrates.

* * * * *